Patented Aug. 23, 1932

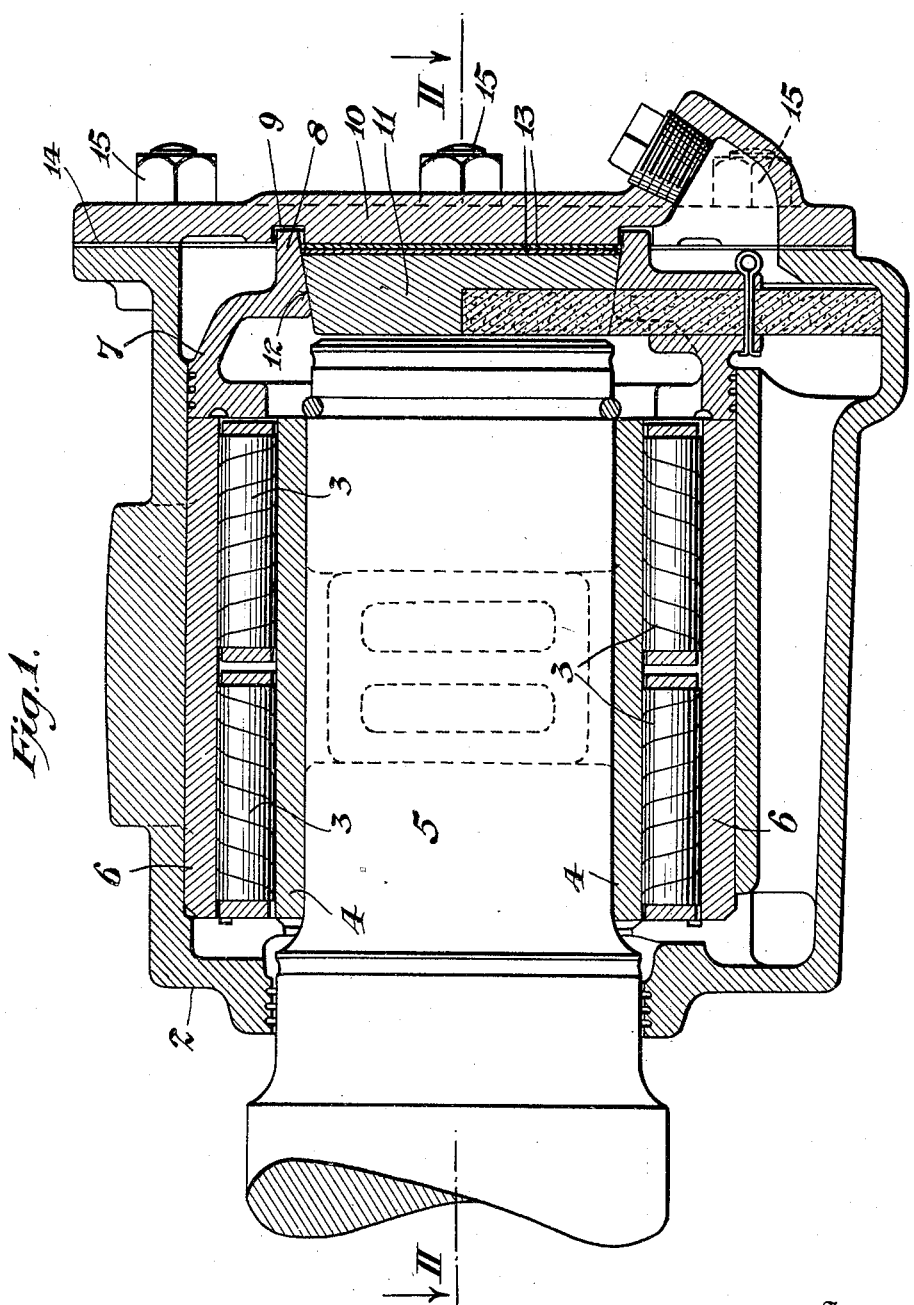

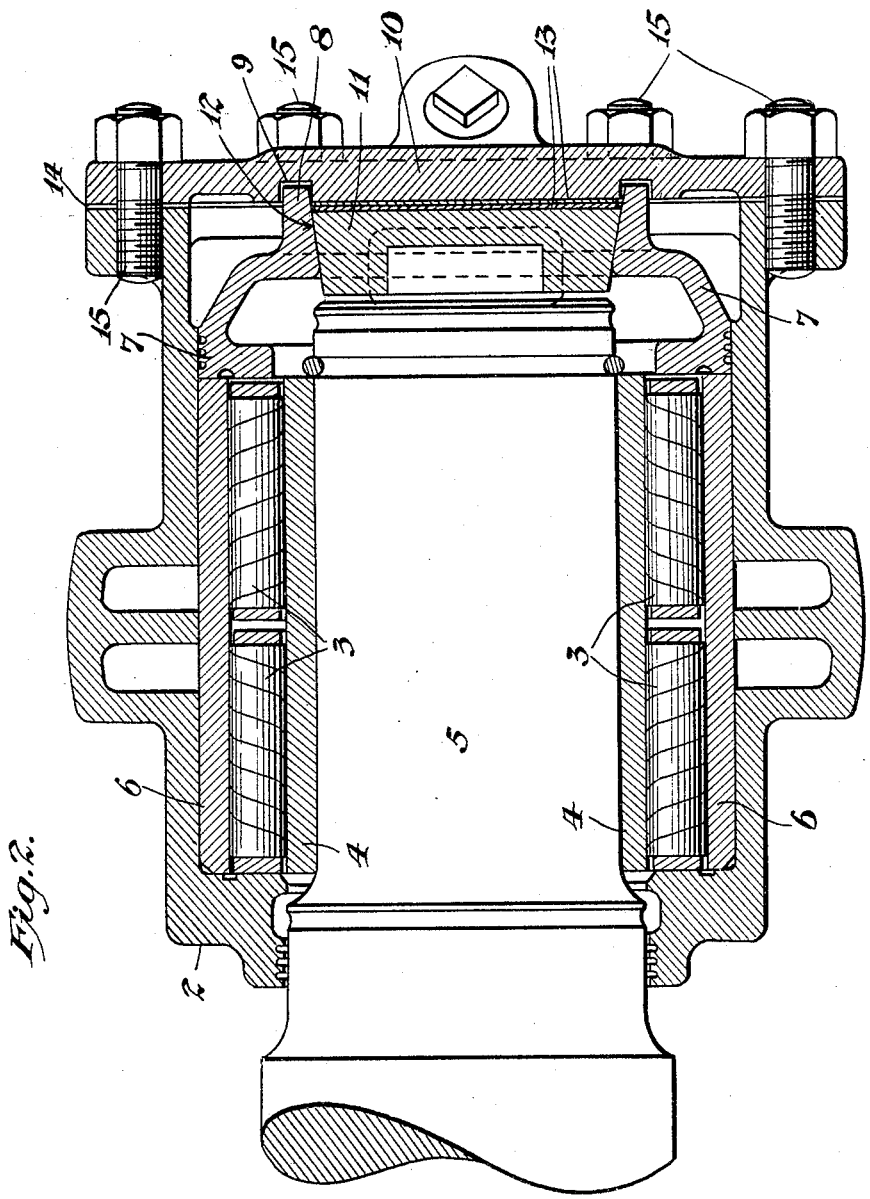

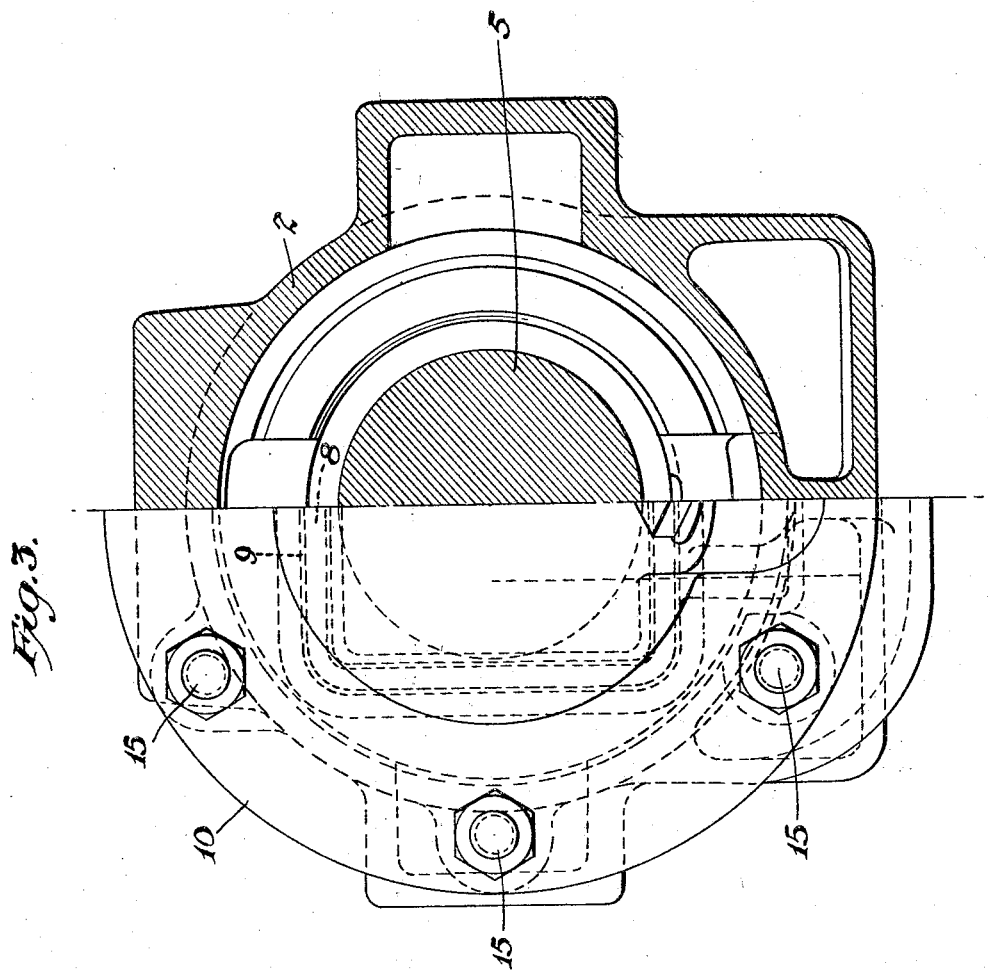

1,873,541

UNITED STATES PATENT OFFICE

ALBERT O. BUCKIUS, OF CLEVELAND, OHIO, ASSIGNOR TO NATIONAL MALLEABLE AND STEEL CASTINGS COMPANY, OF CLEVELAND, OHIO, A CORPORATION OF OHIO

ROLLER BEARING JOURNAL BOX

Application filed August 12, 1927. Serial No. 212,447.

My invention relates to roller bearing journal boxes. While roller bearing journal boxes to some extent have been utilized for railroad cars, the high cost of the boxes has made their application on a substantial commercial scale practically prohibitive from the point of cost. My invention is directed to a substantial elimination of the machine work now required in the making of such boxes, and to a simplification of the parts which greatly reduces the cost thereof and provides a much more durable and effective structure. My invention also comprises various features which I shall hereinafter describe and claim.

In the accompanying drawings Fig. 1 is a vertical section of a roller bearing journal box embodying my invention. Fig. 2 is a horizontal section on lines II—II of Fig. 1, and Fig. 3 is an end elevation of the box half in section.

Referring more specifically to the drawings, 2 indicates the journal box or housing having therein roller bearings 3 mounted between the race 4 carried by the journal 5, and the race 6 rigid with the housing 2. The bearings 3 are held in position by means of the annular spacer 7 which is held from turning with the roller bearings by means of the projecting portion 8 which extends into the recess 9 which may be cast in the inner face of the housing closure 10. Both the projection 8 and recess 9 are preferably of rectangular shape.

The thrust block 11, which engages the end of the journal and holds the housing in proper relation thereto, seats in a central aperture 12 in the spacer 7 which is preferably tapered.

To compensate for wear of the thrust block, shims 13 may be inserted between the thrust block 11 and the closure 10. The closure 10 is secured to the box by the bolts 15.

It will thus be seen that the various surfaces of my device, such as the edges 14 of the housing engaged by the closure 10 and the inner face of the closure, may be brought to bearing by the usual grinding operation and that special machining is not required in any of the parts.

The thrust block may, if desired, be a babbitt die casting.

The terms and expressions which I have employed are used as terms of description and not of limitation, and I have no intention, in the use of such terms and expressions, of excluding any mechanical equivalents of the features shown and described, or portions thereof, but recognize that various structural modications are possible within the scope of the inventions claimed.

What I claim is:

1. In a journal box having roller bearings arranged between the journal and the housing; a spacing member adjacent the ends of the roller bearings to hold them in operative position; an angled projection on the spacer; a closure for the box having a recess in which the projection seats adapted to hold the spacer against rotation the inner face of the closure being flat and terminating at the entrance to the box; and a thrust block seated in an opening in the spacer and hel din operative relation to the journal by the closure member.

2. In a journal box having roller bearings arranged between the journal and the housing; a spacing member adjacent the ends of the roller bearings to hold them in operative position; a rectangular projection on the spacer; a closure for the box having a rectangular recess in which the projection seats to hold the spacer against rotation; and a thrust block seated in an opening in the spacer and held in operative relation to the journal by the closure member.

3. In a journal box having roller bearings arranged between the journal and the housing; a spacing member adjacent the ends of the roller bearings to hold them in operative position; a projection on the spacer; a closure for the box having an inner face adapted to be brought to a flat bearing over substantially its whole area by a grinding tool, and having also a recess therein for the said projection adapted to hold the spacer against rotation; and a thrust block seating in an opening in the spacer and held in operative relation to the journal by the closure member.

4. In a journal box having roller bearings arranged between the journal and the housing; a spacing member adjacent the ends of the roller bearings to hold them in operative position; a closure for the box interlocking with the spacer to hold it against rotation; said closure having a flat inner face terminating at the entrance to the box whereby said face is adapted to be brought to a flat bearing with the housing by a straight grinding operation, said spacer having an outwardly flared rectangular opening, and a thrust block in said opening held from inward movement by said flared opening and held from outward movement by the closure member.

5. In a journal box having roller bearings arranged between the journal and the housing, a closure for the housing, a spacing member separable from said closure and cooperating between said closure and bearings to hold the latter in operative position, said member having a flared opening therethrough, and a thrust block mounted in said opening, said block and opening having cooperating surfaces to prevent relative rotation, and said closure serving to hold said thrust block in said opening.

6. In a journal box having roller bearings arranged between the journal and the housing, a spacing member adjacent the ends of the roller bearings to hold them in operative position, a closure for the box having a slot and projection engagement with the spacer arranged to hold it against rotation, said engagement being wholly outside of the mouth of the box, the inner face of the closure being flat and terminating at the entrance to the box, and a thrust block seated in an opening in the spacer and held in operative position therein by the closure member.

7. In a journal box having roller bearings arranged between the journal and the housing, a spacing member adjacent the ends of the roller bearings to hold them in operative position, a closure for the box having a slot and projection engagement with the spacer arranged to hold it against rotation, said engagement being wholly outside of the mouth of the box, the inner face of the closure being flat and terminating at the entrance to the box, and a thrust block adapted for intermittent engagement with the journal seated in a symmetrical opening in the spacer and held in operative position therein by the closure member.

8. In a journal box having roller bearings arranged between the journal and the housing, a spacing member adjacent the ends of the roller bearings to hold them in operative position, a closure for the box having a slot and projection engagement with the spacer arranged to hold it against rotation, said engagement being wholly outside of the mouth of the box, the inner face of the closure being flat and terminating at the entrance to the box, and a thrust block seated in a tapered opening in the spacer and held in operative position therein by the closure member.

9. In a journal box having roller bearings arranged between the journal and the housing, a spacing member adjacent the ends of the roller bearings to hold them in operative position, a closure member seating against the open end of the housing, the inner face of the closure being flat and terminating at the entrance to the box and having recesses in its inner vertical face for receiving portions of the spacer to hold the same against rotation, and a thrust block seated in the spacer and held in operative relation to the journal by the closure.

ALBERT O. BUCKIUS.